United States Patent
Safadi et al.

(10) Patent No.: US 7,050,109 B2
(45) Date of Patent: May 23, 2006

(54) METHODS AND APPARATUS FOR THE PROVISION OF USER SELECTED ADVANCED CLOSE CAPTIONS

(75) Inventors: Reem Safadi, Horsham, PA (US); Sean Anthony Reamer, Lansdale, PA (US); Mark DiPietro, Harleysville, PA (US); Chuck Barkley, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/798,682

(22) Filed: Mar. 2, 2001

(65) Prior Publication Data

US 2002/0122136 A1 Sep. 5, 2002

(51) Int. Cl.
*H04N 7/08* (2006.01)

(52) U.S. Cl. .................. 348/468; 348/465; 348/569
(58) Field of Classification Search ............ 348/465, 348/468, 564, 553, 569, 722; 345/723; 725/137
See application file for complete search history.

(56) References Cited

U.S. PATENT DOCUMENTS

| | | | |
|---|---|---|---|
| 4,568,981 A | | 2/1986 | Beaulier |
| 5,477,274 A | * | 12/1995 | Akiyoshi et al. ........... 348/468 |
| 5,561,471 A | * | 10/1996 | Kim ............................ 348/565 |

(Continued)

FOREIGN PATENT DOCUMENTS

| | | |
|---|---|---|
| EP | 0 662 770 | 7/1995 |
| WO | 00/57642 | 9/2000 |

OTHER PUBLICATIONS

*Digital Television (DTV) Closed Captioning, EIA–708–B Standard*, Electronic Industries Alliance, Dec. 1999 (92 Pages).

*Recommended Practice for Line 21 Data Service, EIA–608 Standard*, Electronics Industries Association, Sep. 1994 (129 Pages).

*Comments of General Instrument Corporation* (Before the Federal Communications Commission), General Instrument Corporation, Oct. 19, 1999 (19 Pages).

*Answers to Questions Regarding Advanced Closed Captioning, DVS 157, EIA708B, etc.*, Motorola, Inc., Mar. 8, 2000 (7 Pages).

*Patent Abstracts of Japan*, vol. 1999, No. 12, Oct. 29, 1999, Abstract of Japanese Patent "Computer System and Closed Caption Display Method", Publication No. 11196386, Jul. 21, 1999.

*Patent Abstracts of Japan*, vol. 1999, No. 07, Abstract of Japanese Patent "Subtitle Display controller and Its Control Method", Publication No. 06225174, Aug. 12, 1994.

*Primary Examiner*—Victor R. Kostak
(74) *Attorney, Agent, or Firm*—Thomas Bethea, Jr.

(57) ABSTRACT

User customizable advanced closed caption capbilities are provided using existing closed caption information contained in a television signal. The invention allows the user to override the closed caption presentation format as selected by the originator (e.g., programmer or broadcaster), in order to select alternate presentation attributes based on the user's preference. Closed caption information is extracted (e.g., by a closed caption processor from a television signal, which television signal also contains corresponding audiovisual programming. The processor determines whether one or more user selected attributes have been set. At least one user selected attribute is applied to at least a portion of the closed caption information via a closed caption driver. The closed caption information is displayed via a display driver and graphics processor on a display device in accordance with the user selected attributes via a graphical overlay on top of the audiovisual programming.

54 Claims, 5 Drawing Sheets

U.S. PATENT DOCUMENTS

| | | | | |
|---|---|---|---|---|
| 5,570,295 A | * | 10/1996 | Isenberg et al. | 379/90.01 |
| 5,572,260 A | * | 11/1996 | Onishi et al. | 348/460 |
| 5,576,768 A | | 11/1996 | Gomikawa | |
| 5,579,308 A | * | 11/1996 | Humpleman | 370/352 |
| 5,589,841 A | * | 12/1996 | Ota | 343/760 |
| 5,701,161 A | * | 12/1997 | Williams et al. | 348/468 |
| 5,742,352 A | | 4/1998 | Tsukagoshi | |
| 5,818,935 A | * | 10/1998 | Maa | 380/20 |
| 5,844,615 A | | 12/1998 | Nuber | |
| 5,929,927 A | * | 7/1999 | Rumreich et al. | 348/563 |
| 6,271,892 B1 | * | 8/2001 | Gibbon et al. | 348/700 |
| 6,297,797 B1 | * | 10/2001 | Takeuchi et al. | 345/141 |
| 6,430,357 B1 | * | 8/2002 | Orr | 386/69 |
| 6,608,930 B1 | * | 8/2003 | Agnihotri et al. | 382/176 |
| 2002/0067428 A1 | * | 6/2002 | Thomsen | 348/465 |
| 2002/0075403 A1 | * | 6/2002 | Barone et al. | 348/461 |
| 2003/0227565 A1 | * | 12/2003 | Hamilton et al. | 348/468 |

* cited by examiner

METHODS AND APPARATUS FOR THE PROVISION OF USER SELECTED ADVANCED CLOSE CAPTIONS

BACKGROUND OF THE INVENTION

The present invention relates generally to the provision of closed captioning for television and other audiovisual programming. In particular, the present invention provides advanced closed caption features using existing closed caption information carried in the television signal. The invention allows a user to override the closed caption presentation format as selected by the originator (e.g., programmer or broadcaster), in order to select alternate presentation attributes based on the user's preference. User customizable advanced closed caption features are provided, such as font size, font type, font color, caption window position, caption window size, print direction, scroll direction, scroll rate, text opacity, background opacity, text justification left, text justification right, text justification center, background color, and the like.

Closed captions are captions that are hidden in the video signal. Recovery of closed captions for display along with the television programming requires a closed caption decoder to be used in connection with the television receiver.

Beginning around 1980, closed captioning of video programs in the United States utilized Line 21 of the Vertical Blanking Interval (VBI) of a National Television Standards Committee (NTSC) television signal to carry closed caption data. In 1990, Congress passed the TV Decoder Circuitry Act, which required closed caption decoders in most television receivers. The TV Decoder Circuitry Act required the Federal Communications Commission (FCC) to produce standards for closed caption decoders. The FCC, with assistance from the Electronic Industries Association (EIA) Television Data Systems Subcommittee, has developed certain standards for the delivery of closed captions, including the EIA-608 and the EIA-708 standards. One technique for communicating VBI data, such as closed captions, in digital television data streams is disclosed in commonly assigned U.S. Pat. No. 5,844,615, entitled Communication of VBI Data in Digital Television Data Streams, incorporated herein by reference.

The EIA-608 standard, developed in 1991, is based on the Line 21 system and utilizes the DVS-157 standard for carriage format of the EIA-608 captions in digital cable systems. DVS-157 is a standard that has been established for the cable industry by the Digital Video Subcommittee (DVS) of the Society of Cable Telecommunications Engineers ("SCTE"). The EIA-608 closed captions are provided in a single, unalterable configuration.

The EIA-708 standard is a new standard which was developed in recent years and which utilizes the carriage format specified in the Advanced Television System Committee's (ATSC) A/53 standard for digital video. The EIA-708 standard is meant to provide "advanced" closed caption features in digital television signals at the Closed Captioning origination device. The EIA-708 "advanced" features include, but are not limited to, the ability to change certain closed caption features, such as the location of the closed caption display, and the size and color of the closed caption text.

The A/53 format used by the EIA-708 standard is not backward compatible with existing digital cable systems. Millions of existing set-top terminals currently in use by consumers support the EIA-608 standard carried digitally in DVS-157. These set-top terminals are incapable of being upgraded to accommodate the A/53 format utilized in the EIA-708 standard. Replacing the existing set-top terminals with EIA-708 compatible systems would be costly to consumers and operators alike.

SUMMARY OF THE INVENTION

The present invention relates generally to the provision of closed captioning for television and other audio-visual programming. In particular, the present invention provides user customizable advanced closed caption features using existing closed caption information carried in the television signal. The user customizable advanced closed caption features include features such as font size, font type, font color, caption window position, caption window size, print direction, scroll direction, scroll rate, text opacity, background opacity, text justification left, text justification right, text justification center, background color, and the like. Closed caption information is extracted (e.g., by a closed caption processor) from a television signal, which television signal also contains corresponding television programming. The processor determines whether one or more user selected attributes have been set. At least one user selected attribute is applied to at least a portion of the closed caption information (e.g., via a closed caption driver). The closed caption information is displayed (e.g., via a display driver and graphics processor) on a display device (e.g., a television screen) in accordance with the user selected attributes via a graphical overlay on top of the television programming. In this manner, user selected advanced closed caption features can be provided at the display device using existing closed caption information contained within the television signal.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

The invention is described in connection with closed caption information, which should be understood to include not only closed caption text, but also any other information necessary for the display of closed captions, including but not limited to contextual and graphical information. However, it should be appreciated by those skilled in the art that the invention is not limited to customizing of traditional closed caption information. The invention can also be implemented to allow for customization of any type of textual information contained within or associated with a video signal, such as subtitles, stock tickers, advertising banners, emergency alert signals, and the like.

Figure 1:
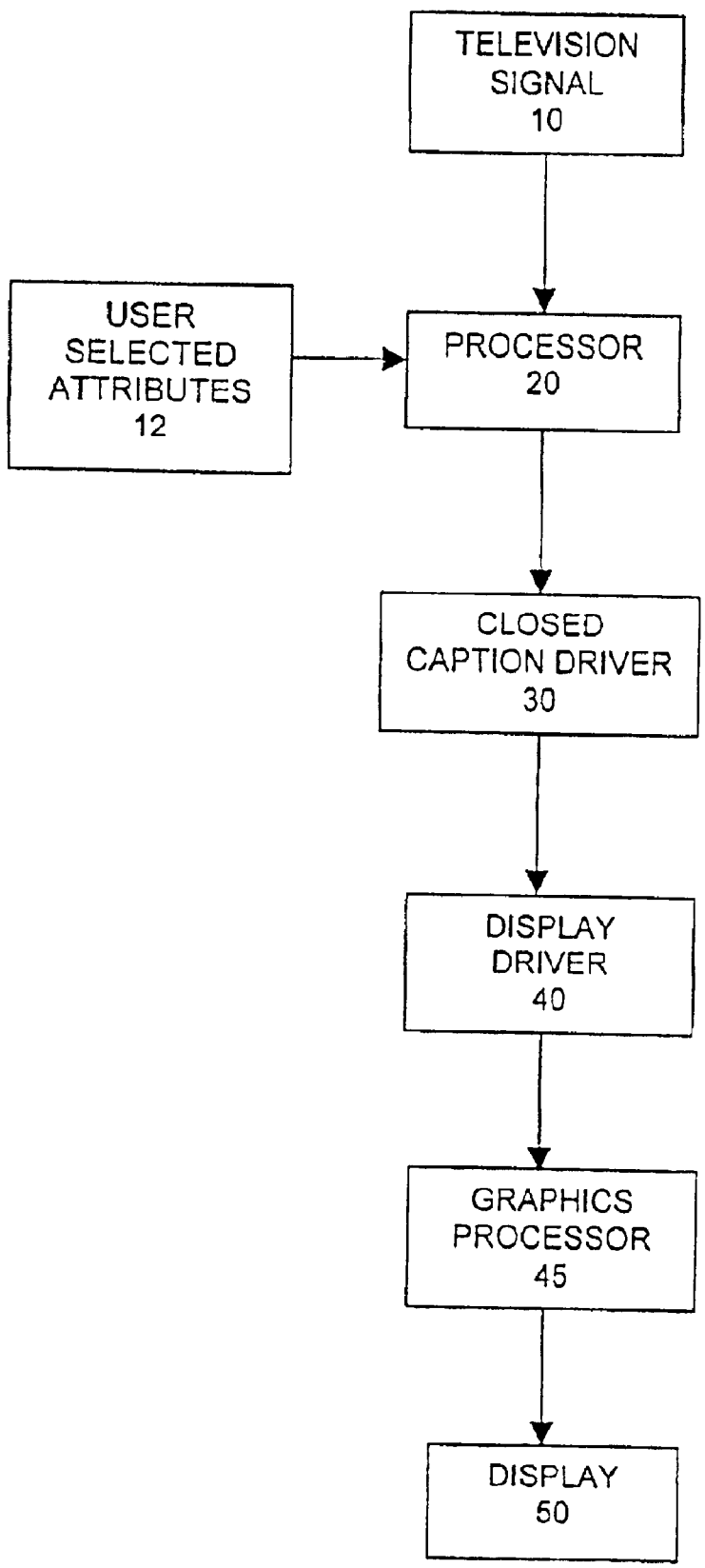
FIG. 1 shows a block diagram of an exemplary embodiment of the invention.

FIG. 1 is a block diagram of an exemplary embodiment of the present invention. A television signal 10 containing closed caption information and associated television programming is provided to a processor 20. User selected closed caption attributes 12 are also provided to the processor 20. The processor 20 extracts the closed caption information. The user selected attributes 12 are applied to at least a portion of the extracted closed caption information by a closed caption driver 30. A display driver 40 provides the closed caption information with user selected attributes to a graphics processor 45. The graphics processor 45 provides the closed caption information with the user selected attributes applied thereto to a display device 50. The closed caption driver 30 and the display driver 40 may be implemented, e.g., as software or firmware on or associated with the processor 20. The graphics processor 45 is implemented in hardware and firmware.

Figure 2:
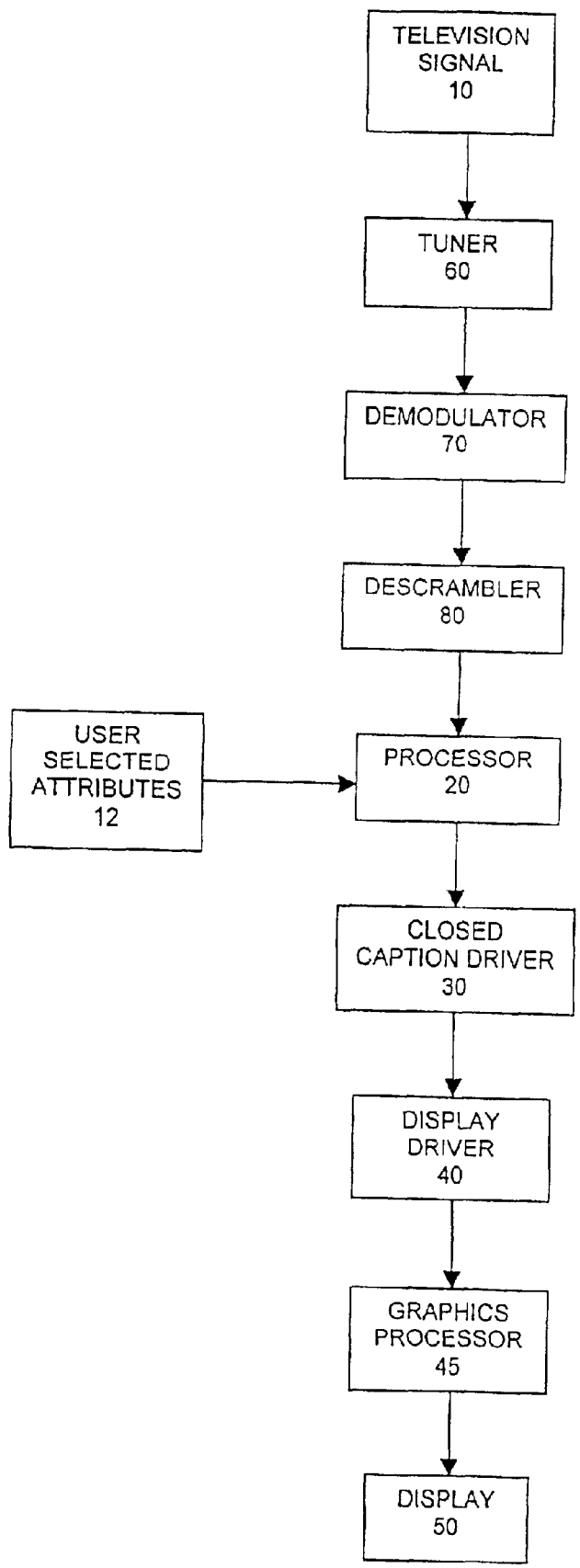
FIG. 2 shows a block diagram of a further exemplary embodiment of the invention.

As shown in FIG. 2, the television signal 10 may be received at a tuner 60 and demodulated at demodulator 70 prior to the extracting of the closed caption information at the processor. In addition, if scrambled, the television signal 10 will be descrambled at descrambler 80 prior to the extracting of the closed caption information. It should be appreciated by those skilled in the art that a standard MPEG-2 transport and video processor will also be necessary for processing digital data streams. This MPEG processor can be implemented as part of processor 20 or as a separate processor associated therewith. Those skilled in the art will appreciate that the digital television signal is forwarded from the video processor (VDP) on the bus to a graphics processor. Next the signal is forwarded to a device that controls bus and burst mode digital video transfers, then the signal is forwarded to where VBI insertion is performed (from the information forwarded to it) and finally digital/analog (NTSC) conversion is performed.

Figure 3:
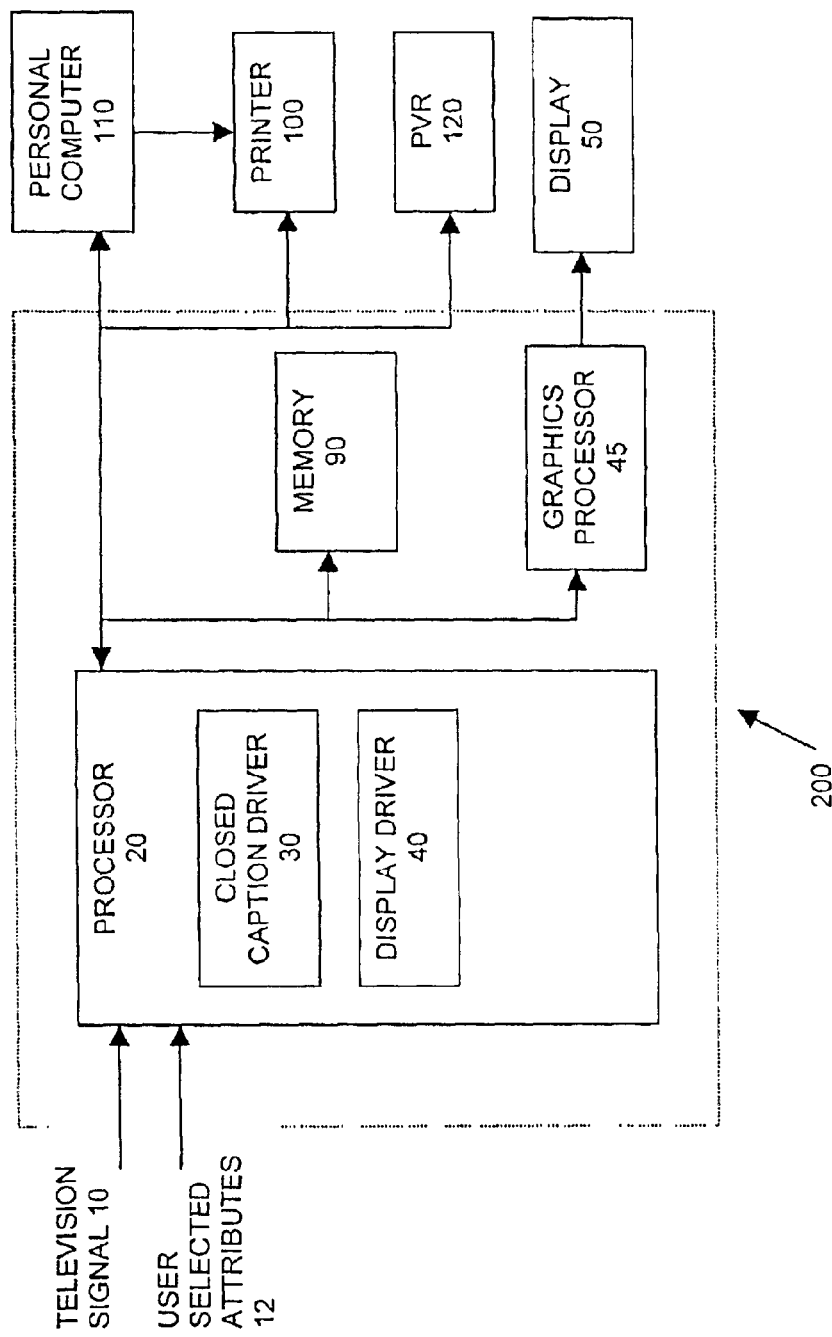
FIG. 3 shows a block diagram of a preferred embodiment of the invention.

In a preferred embodiment of the invention as shown in FIG. 3, user selected advanced closed captions are provided. Closed caption information is extracted (e.g., by a closed caption processor 20) from a television signal 10, which television signal also contains corresponding television programming. The processor 20 determines whether one or more user selected attributes 12 have been set. At least one user selected attribute 12 is applied to at least a portion of the closed caption information (e.g., via a closed caption driver 30). The closed caption information is displayed (e.g., via a display driver 40 and graphics processor 45) on a display device 50 (e.g., a television screen) in accordance with the user selected attributes 12 via a graphical overlay on top of the television programming. In this manner, user selected advanced closed caption features can be provided using existing closed caption information contained within the television signal.

The invention may be implemented as part of a set-top terminal, a digital television, a personal computer, a digital video recorder, a digital video disk player, or other suitable device. Alternatively, the invention may be implemented in a stand-alone device 200 as shown in FIG. 3 which receives a television or other video signal 10 and is coupled to a display device 50. The user selected attributes may be applied to closed caption information which is received (along with corresponding television programming) via a personal versatile recorder (PVR), a set-top terminal, a digital television, a personal computer, a video cassette recorder, a digital video recorder, a digital video disk player, or similar device. In the alternative, the television signal 10 containing the closed caption information and associated television programming may be received via a delivery network, such as a cable or satellite television network, a terrestrial network, the Internet, or other suitable communication network. Those skilled in the art will appreciate that the television signals discussed herein include not only traditional types of television signals, but also any non-traditional television signals containing closed caption or other textual data. For example, the television signal 10 may comprise an analog signal, a broadcast or on-demand digital signal, singlecast or multicast streaming media, and the like.

The user selected attributes 12 may include font size, font type, font color, caption window position, caption window size, print direction, scroll direction, scroll rate, text opacity, background opacity, text justification left, text justification right, text justification center, background color, and the like.

The closed caption information may be displayed in one or more closed caption boxes. Multiple closed caption boxes may be displayed simultaneously (e.g., for use with picture-in-picture features or to provide viewing of the closed caption text for more than one channel while viewing a single television program).

The closed caption information may be tagged with an identifier that distinguishes it from the television programming data. The closed caption information can then be extracted from the television signal based on the identifier. The television signal may comprise an MPEG-2 transport stream. The closed caption information may be carried in a user data field of video data syntax of the MPEG-2 transport stream. In such an embodiment, extracting the closed caption information may be performed based on the user data field. This applies when working with, for example, EIA-608 standard closed caption information. Pursuant to the EIA-608 standard, closed caption bytes in DVS-157 are delivered in the user_data syntax of the video syntax of DVS-018, which is compatible with the video syntax of A/53, an ATSC Digital Television Standard. The encoder (at the origination location) incorporates the caption bytes, as forwarded via one of its interfaces, following the syntax in user_data of the video syntax of a digital stream. The decoder (e.g., set-top terminal), when decoding a digital stream receives these bytes in the aforementioned format, extracts them and transcodes them as an EIA-608 VBI signal on the analog signal. This analog signal is a result of the decoder decoding the digital (MPEG-2) stream and converting it to an analog NTSC signal.

The closed caption information may comprise one of EIA-608 closed caption information or EIA-708 closed caption information.

Figure 4:
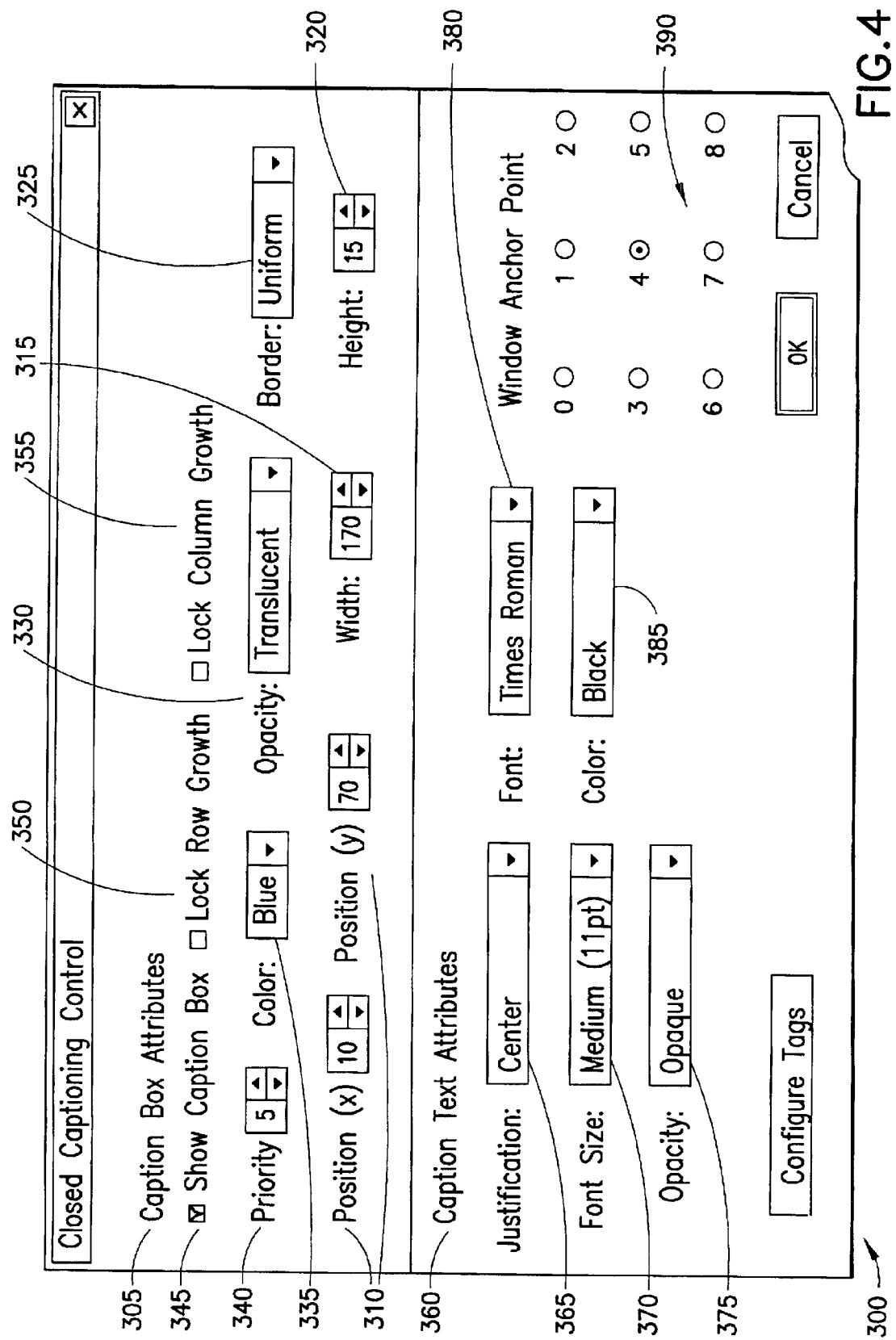
FIG. 4 shows an example of a menu box for entering the user selected advanced closed caption attributes.
Figure 5:
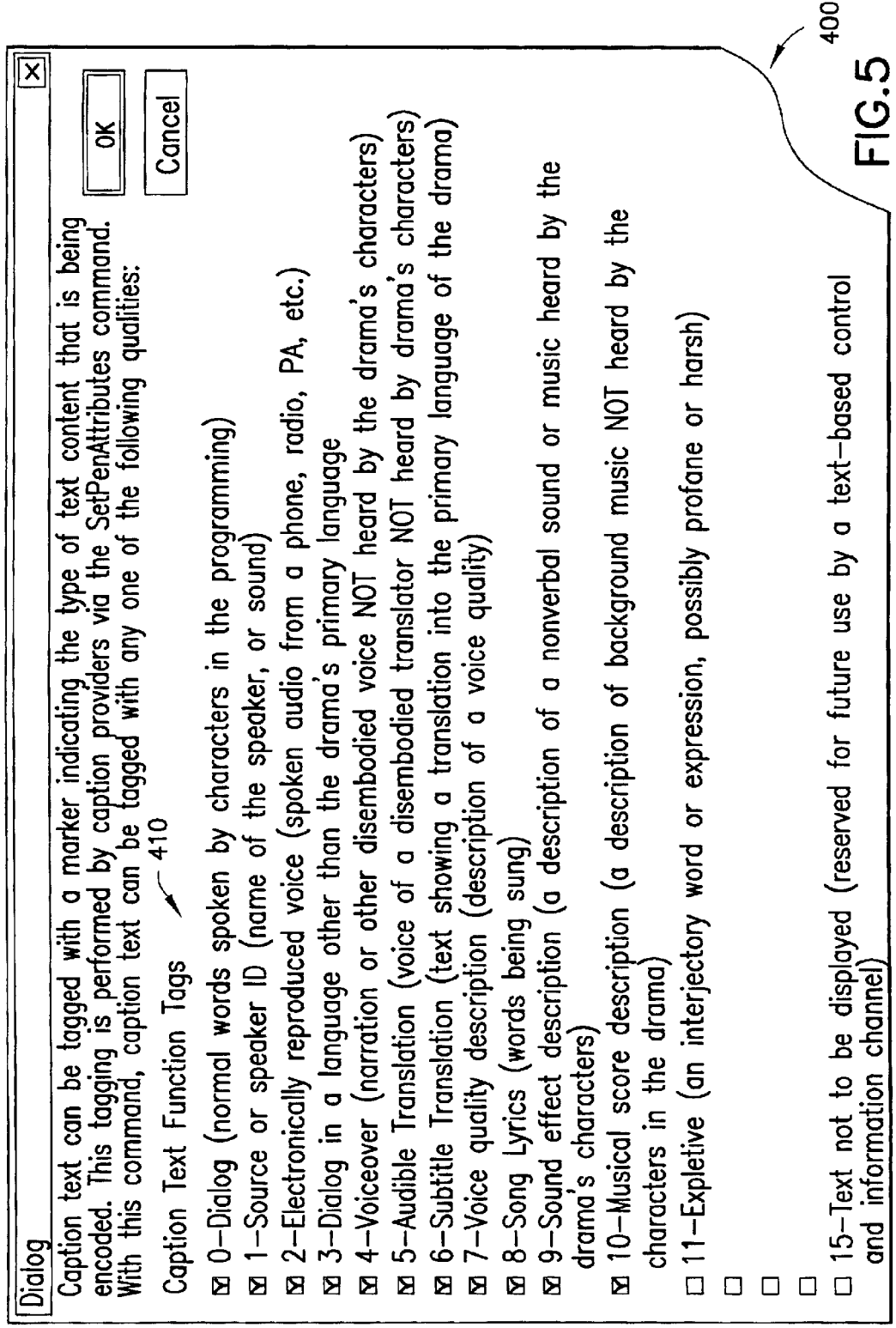
FIG. 5 shows a further example of a menu box for entering additional user selected advanced closed caption attributes.

The user selected attributes can be entered via a pop-up menu, a dialogue box, a pull-down window menu, or other suitable mechanism or combination of mechanisms. For example, FIG. 4 shows a menu 300 of user selectable closed caption attributes. FIG. 4 shows closed caption box attributes 305 such as box position 310, box width 315, box height 320, border 325, opacity 330, box color 335, priority 340, show caption box 345, lock row growth 350 and lock column growth 355. Closed caption text attributes 360 are also shown, including justification 365, font size 370, opacity 375, font type 380, font color 385, and anchor point 390. FIG. 5 shows a menu 400 of closed caption configuration tags, such as those provided pursuant to the EIA-708 standard, which indicate the type of text content being displayed. The tags 410 include indicators of such as dialog (normal words spoken by characters in the programming), source or speaker identification (name of the speaker or source of sound), electronically reproduced voice (spoken audio from a phone, radio, PA system, and the like), dialog in language other than primary program language, voiceover (narration or other disembodied voice not heard by the program's characters), audible translation (voice of disembodied translator not heard by the program's characters), subtitle translation (text showing a translation into the primary language of the program), voice quality description (description of a voice quality), song lyrics (words being sung), sound effect description (a description of a nonverbal sound or music being heard by the program's characters), musical score description (a description of background music not heard by the character's in the program), expletive (an interjectory word or expression, possibly profane or harsh).

As shown in FIG. 3, the user selected attributes may be stored in memory 90. Multiple attribute settings may be provided such that different users can store their respective preferred attributes for future use.

In a preferred embodiment of the invention, the processor 20 may dynamically determine the location of one or more objects of interest in a displayed television scene. Once an object of interest is identified, at least one of the user selected attributes 12 can be adjusted to make the presence of the displayed closed caption information less distracting based on the location of the one or more objects of interest.

The closed caption information may be stored in memory 90. The closed caption information may be stored on one of a personal versatile recorder, a digital television, a digital video recorder, a digital video disk player, a set-top terminal, a personal computer, or other suitable device. The user selected attributes 12 may include the option of automatically generating a transcript of the television programming from the stored closed caption information. The transcript may then be printed from an associated printer 100.

User controlled replay of the stored closed caption information may be provided. Onscreen review of closed caption text from the stored closed caption information may also be provided, which may be by a full screen display or a partial screen display. Page numbers, time and date, and program title may be inserted into the stored closed caption information.

Closed caption text from the stored closed caption information may be transferred to writeable media. The writeable media may comprise memory 90 contained within the same device which provides the advanced closed caption features. In the alternative, the writeable media may be located in a device separate from that which provides the advanced closed caption features. For example, the closed caption text from the stored closed caption information may be transferred (e.g., in Rich Text Format (RTF)) to a personal computer 110 for storage on a hard drive, CD ROM, diskette, or any other suitable storage device. Similarly, the closed caption text may also be transferred to a printer 100, a personal versatile recorder (PVR) 120, a digital television, a digital video recorder, a digital video disk player, a set top terminal, or other suitable device for further personal use or manipulation.

File management functions may be provided for multiple stored closed caption files, wherein each stored closed caption file corresponds to a single television program. The file management functions may be provided by a personal versatile recorder 120, a digital video recorder, a digital television, a digital video disk player, a set-top terminal, a personal computer 110, or other suitable device.

Bookmarks may be inserted and subsequently located in the closed caption text of the stored closed caption information by a user via, e.g., remote control.

In an alternate embodiment, the currently displayed closed caption information may be removed after a predetermined time period in which no closed caption information is received.

In a further embodiment of the invention, dynamic adjustment of closed caption text color is provided when a transparent closed caption background is selected. When a transparent background is selected, the closed caption text is presented directly over the television programming. As the color of the displayed television programming may change periodically, there exists the possibly of conflict with the chosen color of the closed caption text. By dynamically adjusting text color, the closed caption text will always be visible over the television programming. Those skilled in the art will appreciate that such dynamic adjustment is more appropriately provided at the origination site rather than at a destination location due to the difficulty in the processing (real-time) which would be required at the destination or viewing location.

Unicode character technology may be utilized in order to provide internationalization of the closed caption information. Unicode is an international standard for representing strings (concatenated characters) using 16-bit characters (65,536 possible characters). The Unicode standard allows for non-English alphabet characters and graphical symbols.

In an alternate embodiment of the invention, the user selected attributes 12 may be automatically overridden when an Emergency Alert Signal is received in order to avoid overlap of the displayed closed caption information with a display of the Emergency Alert Signal.

The user selected attributes may be disabled on a per program basis or a per channel basis.

It should now be appreciated that the invention provides advantageous methods and apparatus which allow user selectable advanced closed caption features to be generated using existing closed caption information. Further, the present invention accommodates both the EIA-608 standard and the EIA-708 standard closed captions.

Although the invention has been described in connection with various illustrated embodiments, numerous modifications and adaptations may be made thereto without departing from the spirit and scope of the invention as set forth in the claims.

What is claimed is:

1. A method for provision of user selected advanced closed captions at a set-top television terminal, comprising the steps of:

enabling user selection of a plurality of closed caption display attributes via a graphical user interface provided on a display device associated with said terminal;

extracting closed caption information from a broadcast television signal having corresponding television programming;

determining whether one or more user selected display attributes have been set;

applying at least one user selected display attribute to at least a portion of the closed caption information; and displaying the closed caption information on said display device in accordance with the user selected display attributes via a graphical overlay on top of the television programming;

wherein the display attributes comprise at least one of caption window size, print direction, scroll direction, scroll rate, text opacity, background opacity, text justification left, text justification right, text justification center, and background color.

2. A method in accordance with claim 1, wherein:
the television signal is received, demodulated, and descrambled prior to said extracting of said closed caption information.

3. A method in accordance with claim 1, wherein:
the closed caption information is displayed in one or more closed caption boxes.

4. A method in accordance with claim 3, wherein multiple closed caption boxes are displayed simultaneously.

5. A method in accordance with claim 1, wherein:
the closed caption information is tagged with an identifier that distinguishes it from television programming data; and
the closed caption information is extracted based on the identifier.

6. A method in accordance with claim 1, wherein:
the television signal comprises an MPEG-2 transport stream;
the closed caption information is carried in a user data field of video data syntax of the MPEG-2 transport stream; and
the closed caption information is extracted based on the user data field.

7. A method in accordance with claim 1, wherein said closed caption information comprises one of EIA-608 closed caption information or EIA-708 closed caption information.

8. A method in accordance with claim 1, wherein the user interface comprises at least one of a pop-up menu, a dialogue box, and a pull-down window menu.

9. A method in accordance with claim 1, further comprising the step of:
storing the user selected display attributes in memory.

10. A method in accordance with claim 1, further comprising the steps of:
dynamically determining the location of one or more objects of interest in a displayed television scene; and
automatically adjusting at least one of the user selected display attributes to make the presence of the displayed closed caption information less distracting based on the location of the one or more objects of interest.

11. A method in accordance with claim 1, comprising the further step of:
storing the closed caption information in memory.

12. A method in accordance with claim 11, wherein the user selected display attributes include the option of automatically generating a transcript of the television programming from the stored closed caption information.

13. A method in accordance with claim 12, comprising the further step of printing the transcript.

14. A method in accordance with claim 11, comprising the further step of:
providing user controlled replay of the stored closed caption information.

15. A method in accordance with claim 11, comprising the further step of:
providing on-screen review of closed caption text from the stored closed caption information.

16. A method in accordance with claim 11, comprising the further step of:
inserting into the stored closed caption information at least one of page numbers, time and date of storing, and television program title.

17. A method in accordance with claim 11, comprising the further step of transferring closed caption text from the stored closed caption information to writeable media.

18. A method in accordance with claim 11, comprising the further step of:
transferring closed caption text from the stored closed caption information to one of a printer, a personal versatile recorder (PVR), a digital television, a digital video recorder, a digital video disk player, or a personal computer.

19. A method in accordance with claim 11, comprising the further step of:
providing file management functions for multiple stored closed caption files, wherein each stored closed caption file corresponds to a single television program.

20. A method in accordance with claim 19, wherein said file management functions are provided by one of a personal versatile recorder, a digital television, a digital video recorder, a digital video disk player, or a personal computer.

21. A method in accordance with claim 11, comprising the further steps of:
providing for the insertion of bookmarks into closed caption text of the stored closed caption information; and
providing for the location of the bookmarks inserted into the closed caption text.

22. A method in accordance with claim 1, comprising the further step of:
removing displayed closed caption information after a predetermined time period in which no closed caption information is received.

23. A method in accordance with claim 1, comprising the further step of:
providing dynamic adjustment of closed caption text color when a transparent closed caption background is selected.

24. A method in accordance with claim 1, comprising the further step of:
utilizing Unicode character technology for internationalization of closed caption information.

25. A method in accordance with claim 1, comprising the further step of:
receiving an Emergency Alert Signal; and
automatically overriding the user selected attributes in order to avoid overlap of the displayed closed caption information with a display of the Emergency Alert Signal.

26. A method in accordance with claim 1, wherein the user selected display attributes can be disabled on at least one of a per program basis or a per channel basis.

27. Apparatus for provision of user selected advanced closed captions at a set-top television terminal, comprising:
a processor for:
generating a graphical user interface on a display device associated with the terminal for enabling user selection of a plurality of closed caption display attributes;
extracting closed caption information from a broadcast television signal having corresponding television programming;

determining whether one or more user selected display attributes have been set;

a closed caption driver for applying at least one user selected display attribute to at least a portion of the closed caption information;

a display driver; and a graphics processor for displaying the closed caption information received from the display driver on said display device in accordance with the user selected display attributes via a graphical overlay on top of the television programming;

wherein the display attributes comprise at least one of caption window size, print direction, scroll direction, scroll rate, text opacity, background opacity, text justification left, text justification right, text justification center, and background color.

28. Apparatus in accordance with claim 27, further comprising:

a receiver for receiving the television signal;

a demodulator for demodulating the television signal; and a descrambler for descrambling the television signal.

29. Apparatus in accordance with claim 27, wherein:

the closed caption information is displayed in one or more closed caption boxes.

30. Apparatus in accordance with claim 29, wherein multiple closed caption boxes are displayed simultaneously.

31. Apparatus in accordance with claim 27, wherein:

the closed caption information is tagged with an identifier that distinguishes it from television programming data; and the closed caption information is extracted based on the identifier.

32. Apparatus in accordance with claim 27, wherein:

the television signal comprises an MPEG-2 transport stream;

the closed caption information is carried in a user data field of video data syntax of the MPEG-2 transport stream; and the closed caption information is extracted based on the user data field.

33. Apparatus in accordance with claim 27, wherein said closed caption information comprises one of EIA-608 closed caption information or EIA-708 closed caption information.

34. Apparatus in accordance with claim 27, wherein the user interface comprises at least one of a pop-up menu, a dialogue box, and a pull-down window menu.

35. Apparatus in accordance with claim 27, further comprising:

a memory device for storing the user selected display attributes in memory.

36. Apparatus in accordance with claim 27, wherein:

the location of one or more objects of interest in a displayed television scene are dynamically determined; and at least one of the user selected display attributes is automatically adjusted to make the presence of the displayed closed caption information less distracting based on the location of the one or more objects of interest.

37. A method in accordance with claim 27, further comprising:

memory for storing the closed caption information.

38. Apparatus in accordance with claim 37, wherein the user selected display attributes include the option of automatically generating a transcript of the television programming from the stored closed caption information.

39. Apparatus in accordance with claim 38, wherein the transcript is printed.

40. Apparatus in accordance with claim 37, wherein user controlled replay of the stored closed caption information is provided.

41. Apparatus in accordance with claim 37, wherein on-screen review of closed caption text from the stored closed caption information is provided.

42. Apparatus in accordance with claim 37, wherein at least one of page numbers, time and date of storing, and television program title is inserted into the stored closed caption information.

43. A method in accordance with claim 37, wherein closed caption text from the stored closed caption information is transferred to writeable media.

44. Apparatus in accordance with claim 37, wherein closed caption text from the stored closed caption information is transferred to one of a printer, a personal versatile recorder (PVR), a digital television, a digital video recorder, a digital video disk player, or a personal computer.

45. Apparatus in accordance with claim 37, wherein the processor provides file management functions for multiple stored closed caption files, wherein each stored closed caption file corresponds to a single television program.

46. Apparatus in accordance with claim 45, wherein said apparatus comprises one of a personal versatile recorder, a digital television, a digital video recorder, a digital video disk player, or a personal computer.

47. Apparatus in accordance with claim 37, wherein:

inserting of bookmarks into closed caption text of the stored closed caption information is provided for; and locating of the bookmarks inserted into closed caption text of the closed caption information is provided for.

48. Apparatus in accordance with claim 27, wherein the displayed closed caption information is removed after a predetermined time period in which no closed caption information is received.

49. Apparatus in accordance with claim 27, wherein closed caption text color is dynamically adjusted when a transparent closed caption background is selected.

50. Apparatus in accordance with claim 27, wherein Unicode character technology is utilized for internationalization of closed caption information.

51. Apparatus in accordance with claim 27, wherein:

in the event an Emergency Alert Signal is received, the user selected attributes are automatically overridden in order to avoid overlap of the displayed closed caption information with a display of the Emergency Alert Signal.

52. Apparatus in accordance with claim 27, wherein the user selected display attributes can be disabled on at least one of a per program basis or a per channel basis.

53. A method for the provision of user selected advanced closed captions, comprising the steps of:

enabling user selection of a plurality of closed caption display attributes via a graphical user interface provided on a display device;

extracting the closed caption information from a television signal having associated television programming;

determining whether one or more user selected display attributes have been set;

applying at least one user selected display attribute to at least a portion of the closed caption information;

displaying the closed caption information on the display device in accordance with the user selected display attributes via a graphical overlay on top of the television programming;

dynamically determining the location of one or more objects of interest in a displayed television scene; and automatically adjusting at least one of the user selected display attributes to make the presence of the displayed closed caption information less distracting based on the location of the one or more objects of interest.

54. Apparatus for the provision of user selected advanced closed captions, comprising:

a processor for:

generating a graphical user interface on a display device for enabling user selection of a plurality of closed caption display attributes;

extracting the closed caption information from a television signal having associated television programming;

determining whether one or more user selected attributes have been set;

a closed caption driver for applying at least one user selected display attribute to at least a portion of the closed caption information; and a display driver;

a graphics processor for displaying the closed caption information received from the display driver on a display device in accordance with the user selected display attributes via a graphical overlay on top of the television programming;

wherein:

the location of one or more objects of interest in a displayed television scene are dynamically determined; and at least one of the user selected display attributes is automatically adjusted to make the presence of the displayed closed caption information less distracting based on the location of the one or more objects of interest.

* * * * *